(12) United States Patent
Fouda Onana et al.

(10) Patent No.: US 9,595,714 B2
(45) Date of Patent: Mar. 14, 2017

(54) ELECTRODE-FORMING COMPOSITION

(71) Applicant: SOLVAY SPECIALTY POLYMERS ITALY S.P.A., Bollate (IT)

(72) Inventors: Frederic Fouda Onana, Bollate (IT); Riccardo Pieri, Milan (IT); Marco Apostolo, Senago (IT); Hans Edouard Miltner, Rhode-St-Genese (IT); Anne-Lise Goffin, Ath (BE); Shilei Chen, Brussels (BE)

(73) Assignee: SOLVAY SPECIALTY POLYMERS ITALY S.P.A., Bollate, (Milan) (IT)

( * ) Notice: Subject to any disclaimer, the term of this patent is extended or adjusted under 35 U.S.C. 154(b) by 0 days.

(21) Appl. No.: 14/366,318

(22) PCT Filed: Dec. 17, 2012

(86) PCT No.: PCT/EP2012/075686
§ 371 (c)(1),
(2) Date: Jun. 18, 2014

(87) PCT Pub. No.: WO2013/092446
PCT Pub. Date: Jun. 27, 2013

(65) Prior Publication Data
US 2014/0329003 A1    Nov. 6, 2014

(30) Foreign Application Priority Data
Dec. 19, 2011    (EP) .................................... 11194214

(51) Int. Cl.
*H01M 4/00* (2006.01)
*H01B 1/24* (2006.01)
(Continued)

(52) U.S. Cl.
CPC .............. *H01M 4/485* (2013.01); *B05D 5/12* (2013.01); *C08F 214/225* (2013.01); *H01B 1/24* (2013.01);
(Continued)

(58) Field of Classification Search
CPC ........... H01B 1/00; H01B 1/24; H01M 4/123; H01M 4/623; H01M 4/625; B82Y 30/00; C01B 31/043
See application file for complete search history.

(56) References Cited

U.S. PATENT DOCUMENTS 6,203,944 B1    3/2001  Turner et al.
8,337,725 B2 *  12/2012 Abusleme .............. B01D 69/02
                                                  252/511

(Continued)

FOREIGN PATENT DOCUMENTS

WO          0003444 A1      1/2000
WO     WO2008129041 A1 *   10/2008
WO       2011147924 A1     12/2011

OTHER PUBLICATIONS

Haubner et al "The route to functional graphene oxide", ChemPhysChem 2010, 11, 2131-2139.*
(Continued)

*Primary Examiner* — Mark Kopec

(57) ABSTRACT

The present invention pertains to a solvent based electrode-forming composition which comprises at least one vinylidene fluoride (VDF) polymer and a graphene oxide with an oxygen content of no more than 25 wt % dispersed in an organic solvent, wherein the VDF polymer comprises recurring units derived from vinylidene fluoride (VDF) and from at least one (meth)acrylic monomer (MA) having formula (I) here below: wherein: —$R_1$, $R_2$ and $R_3$, equal to
(Continued)

or different from each other, are independently selected from a hydrogen atom and a $C_1$-$C_3$ hydrocarbon group, and —$R_{OH}$ is a hydrogen atom or a $C_1$-$C_5$ hydrocarbon moiety comprising at least one hydroxyl group. The present invention further relates to a process for manufacturing said electrode-forming composition, and the use thereof for manufacturing an electrode of secondary lithium batteries.

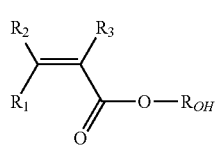

(I)

13 Claims, 1 Drawing Sheet

(51) Int. Cl.
| | |
|---|---|
| B05D 5/12 | (2006.01) |
| H01M 4/485 | (2010.01) |
| H01M 4/131 | (2010.01) |
| H01M 4/1391 | (2010.01) |
| H01M 4/58 | (2010.01) |
| H01M 4/62 | (2006.01) |
| C08F 214/22 | (2006.01) |
| H01M 4/505 | (2010.01) |
| H01M 4/525 | (2010.01) |
| H01M 4/04 | (2006.01) |
| H01M 10/0525 | (2010.01) |

(52) U.S. Cl.
CPC ....... *H01M 4/0402* (2013.01); *H01M 4/0409* (2013.01); *H01M 4/0414* (2013.01); *H01M 4/0419* (2013.01); *H01M 4/131* (2013.01); *H01M 4/1391* (2013.01); *H01M 4/505* (2013.01); *H01M 4/525* (2013.01); *H01M 4/5825* (2013.01); *H01M 4/623* (2013.01); *H01M 4/625* (2013.01); *H01M 4/0404* (2013.01); *H01M 10/0525* (2013.01); *Y02E 60/122* (2013.01); *Y02P 70/54* (2015.11)

(56) References Cited

U.S. PATENT DOCUMENTS

| | | | |
|---|---|---|---|
| 2005/0014867 | A1 | 1/2005 | Gulari et al. |
| 2010/0133482 | A1 | 6/2010 | Abusleme et al. |
| 2011/0111299 | A1 | 5/2011 | Liu et al. |
| 2011/0159372 | A1 | 6/2011 | Zhamu et al. |
| 2012/0026643 | A1* | 2/2012 | Yu .......................... H01G 11/02 361/502 |
| 2012/0164539 | A1* | 6/2012 | Zhamu ................ H01M 4/0445 429/300 |
| 2013/0072613 | A1* | 3/2013 | Miltner .................... C08L 71/02 524/377 |

OTHER PUBLICATIONS

Dreyer et al "The chemistry of graphene oxide", Chem. Soc. Rev., 2010, 39, 228-240.*
Angstron Materials Product Sheet "N002-PDE Graphene Oxide Powder" www.angstronmaterials.com 5 pages, 2015.*
Hernandez, Y. et al., "High-yield production of graphene by liquid-phase exfoliation of graphite", Nature Nanotechnology, 2008, vol. 3, No. 9, pp. 563-568—Macmillan Publishers Limited.
Hernandez, Y. et al., "Measurement of multicomponent solubility parameters for graphene facilitates solvent discovery", Langmuir, 2010, vol. 26, No. 5, pp. 3208-3213—American Chemical Society.
Bahr, J.L. et al., "Dissolution of small diameter single-wall carbon nanotubes in organic solvents", Chem. Commun., 2001, issue 2, pp. 193-194—The Royal Society of Chemistry.
Xin Zhao et al., "Self-assembled lithium manganese oxide nanoparticles on carbon nanotube or graphene as high-performance cathode material for lithium-ion batteries", Journal of Materials Chemistry, Jan. 1, 2011 (Jan. 1, 2011), vol. 21, No. 43, p. 17297, XP055024685, ISSN: 0959-9428, DOI: 10.1039/c1jm12373d—The Royal Society of Chemistry.
Haegyeom Kim et al., "Graphene-Based Hybrid Electrode Material for High-Power Lithium-Ion Batteries", Journal of the Electrochemical Society, Jan. 1, 2011 (Jan. 1, 2011), vol. 158, No. 8, pp. A930-A935, XP055024688, ISSN: 0013-4651, DOI: 10.1149/1.3599632.

* cited by examiner

ELECTRODE-FORMING COMPOSITION

CROSS-REFERENCE TO RELATED APPLICATION

This application is a U.S. national stage entry under 35 U.S.C. §371 of International Application No. PCT/EP2012/075686 filed Dec. 17, 2012, which claims priority to European application No. 11194214.0 filed on Dec. 19, 2011. The entire contents of these applications are explicitly incorporated herein by this reference.

TECHNICAL FIELD

The present invention pertains to a solvent based electrode-forming composition which comprises graphene, to a process for manufacturing said electrode-forming composition, and the use thereof for manufacturing an electrode of secondary lithium batteries.

BACKGROUND ART

Secondary lithium batteries, often known as rechargeable lithium batteries in consumer electronics, have shown great commercial promise due to its relatively high energy density, negligible memory effect and a low loss of charge when not in use.

A typical secondary lithium battery is composed of three primary functional components: a positive electrode (cathode) made from a lithium metal oxide, a negative electrode (anode) made from lithium metal or lithium insertion materials such as lithium alloys or carbon and an electrolyte communicating the two electrodes. Each of the battery electrodes contains an active material (AM) as a primary component, for performing a reversible electrochemical intercalation-deintercalation of lithium ions in the charge/discharge cycles. During charging, an external power source urges lithium ions hosted in the cathode active material to pass through the electrolyte and insert into the anode active material, thus producing a charging current circuit. During discharging, a reversed process is carried out, wherein lithium ions are extracted from the anode and inserted into the cathode.

In order to enable such electrochemical charge/discharge cycles, each electrode in a lithium secondary battery needs to host lithium ions in its active material structure and also possess high conductivity of both lithium ion and electrons. Accordingly, since typical active materials in the electrodes (e.g. lithium metal oxides in the cathode or lithium alloy material in the anode) have low or little electron conductivity, a conductive agent such as a carbon-based nanomaterial must be added together with the low-conductive active material to form a working electrode. Additionally, a binder is also blended in the electrode material, to attach the cathode or anode composite to its respective current collector while providing sufficient cohesion among the powdery active material and conductive agents. A suitable binder material is vinylidene fluoride (VDF) polymer, as is known in the art.

Generally, techniques for manufacturing electrodes involve the use of organic solvents such as N-methyl-2-pyrrolidone (NMP) for dissolving VDF polymer (PVDF) binders and homogenizing them with a powdery electrode material and all other suitable components, including the aforementioned conductive additive, to produce a paste to be applied onto a metal current collector. As a result, the dispersion behaviour of a conductive carbon additive in the organic solvents is an important factor, because carbon particulates having a tendency to flocculate in the solvents are unfavourable for the electrode forming process. Moreover, factors such as surface area and particle size of the conductive additives are found to have strong influence on the charge-discharge capacity and volumetric energy density of the electrode. Among the typically employed conductive additive materials, carbon black is preferably used, due to its satisfactory dispersion stability in the organic solvent, relatively large surface area, and ease of acquisition in the industry. Conductive additives made from carbon black are also much cheaper than those made of carbon nanotubes (CNTs), which are expensive due to low yields during their synthesis and purification process.

However, in the use of carbon black as electrode conductive additives, it has been found that the interaction of this conductive agent with the associated active material in the electrode would notably reduce the number of available charge carrier per volume unit of the electrode, thus leading to an unwanted reduction of "energy density" (in Wh/L) of the battery cell.

Therefore, to improve the energy density of the current lithium battery, it would be beneficial to replace carbon black with a conductive additive having higher conductivity—which could give the battery electrode the required electron conductivity with a smaller weight ratio—for minimizing the energy density loss of the battery active material. In this regard, the carbon nanomaterial of graphene (a single layer and 2-dimensional nanostructure of carbon atoms) was recently found to possess a high surface area to volume ratio and extraordinary electronic transport properties, both properties being superior to the carbon black, making it an attractive conductive additive material in theory. The graphene platelets may be oxidized to various extents during their synthesis, and thus become graphene oxide sheets. Therefore, for the purpose of the present invention, the term "graphene" is used to encompass both pristine, non-oxidized graphene and its oxidized form, and the term "graphene oxide" is intended to denote the oxidized graphene only.

In practice, a main drawback in using pristine graphene material is the difficulty to obtain stable dispersion of pristine graphene in an organic solvent. For example, as reported by Y. Hernandez, etc., when subjecting an initial mixture containing 100 mg/L of exfoliated graphite in NMP—one of the most "efficient" solvents ever reported—to bath sonication, a large number of macroscopic aggregates were observed and the maximum graphene dispensability in the supernatant is merely ~4.7±1.9 mg/L (HERNANDEZ, Y., et al. High-yield production of graphene by liquid-phase exfoliation of graphite. *Nature nanotechnology*. 2008, vol. 3, no. 9, p. 563-568. and HERNANDEZ, Y., et al. Measurement of multicomponent solubility parameters for graphene facilitates solvent discovery. *Langmuir*. 2010, vol. 26, no. 5, p. 3208-13.). The value is much lower than the room-temperature solubility of single-wall CNTs in most organic solvents, as reported by Jeffrey L. Bahr, etc. (BAHR, J. L., et al. Dissolution of small diameter single-wall carbon nanotukbes in organic solvents. *Chem. Commun.* 2001, p. 193-194.). Therefore, the poor dispersion behaviour of pristine graphene in the polar organic solvent unfortunately imposes a challenge in using it for the electrode forming process.

Despite the dispersion instability issue with graphene material, in recent years research resources have been devoted to developing polymer-graphene composites for electrical applications. For instance, US 2005/0014867 (assigned to WAYNE STATE UNIVERSITY) discloses a method comprising diffusing a polymeric agent in a supercritical fluid between layered particles of a graphite structure, and the method further comprising catastrophically depressurizing the supercritical fluid to form exfoliated graphene platelets surrounded by the polymeric coating agent. Although this route is useful in terms of producing pristine graphene platelets covered with a polymeric coating agent, it nevertheless requires the use of high-pressured supercritical fluid (e.g. high-pressured carbon dioxide gas) and the associated high-pressure sustaining reaction vessels connected with a robust piping and heating system, which renders this production route complicated and costly. Hence, it remains a need to find a relatively simple and easy-to-operate route to prepare a well dispersed graphene-polymer blend in an organic solvent for producing an active electrode.

Therefore, an objective of our invention is to make possible the use of graphene as an effective conductive additive in an electrode, by providing a solvent based electrode-forming composition wherein the graphene is well dispersed in an organic solvent together with at least one VDF polymer, with or without an electrode active material.

It is another objective of our invention to provide a process for producing an electrode-forming composition, wherein the composition comprises at least one VDF polymer and a conductive graphene additive in an organic solvent such as NMP.

SUMMARY OF INVENTION

Figure 1:
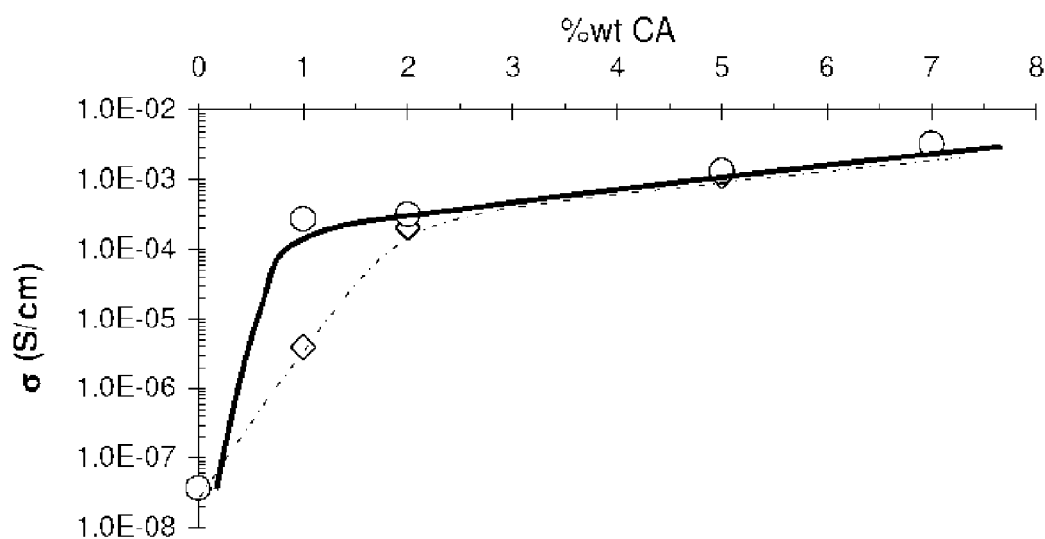
FIG. 1 is a graph comparing the percolation curves obtained from cathodes with different percentage of carbon black (SUPER P®) and graphene oxide (PDR05).

The Applicant has now found that it is possible to produce a working electrode by combining an electrode active material and a composition comprising at least one VDF polymer, a polar organic solvent and a graphene conductive additive, wherein all components are well dispersed in the polar organic solvent.

In particular, the Applicant has found that an oxidized graphene material can be well dispersed in the polar organic solvent of the above-described composition while providing a desired conductivity for the working electrode, given that the oxygen content of said graphene does not exceed 25% by weight.

Moreover, as a preferred embodiment of the present invention, there is provided an electrode-forming composition comprising at least one vinylidene fluoride (VDF) polymer;

at least one polar organic solvent; and a graphene oxide having an oxygen content of no more than 25% by weight, wherein:

the VDF polymer comprises recurring units derived from vinylidene fluoride (VDF) and from at least one (meth) acrylic monomer (MA) having formula (I) here below:

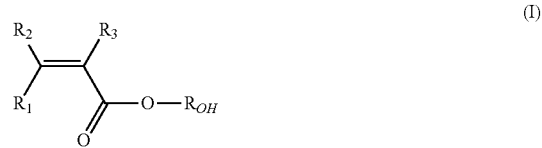

wherein:
R$_1$, R$_2$ and R$_3$, equal to or different from each other, are independently selected from a hydrogen atom and a C$_1$-C$_3$ hydrocarbon group, and
R$_{OH}$ is a hydrogen atom or a C$_1$-C$_5$ hydrocarbon moiety comprising at least one hydroxyl group.

Starting from the aforementioned electrode-forming composition, active electrodes using graphene as conductive additive can be successfully produced. Compared to a commonly used electrode with 5 wt % carbon black conductive agent, the electrodes of the present invention attain an equivalent conductivity and a better kinetic behaviour with merely 1 wt % of graphene oxide. Moreover, the specific selection of VDF copolymer in the aforementioned composition helps form an electrode with better conductivity and discharging capacity, compared to the control reference.

In a further aspect of the present invention, there is provided a process for preparing an electrode-forming composition as aforedescribed, said process comprising:

(i) mixing the VDF polymer and the graphene oxide having an oxygen content of no more than 25% by weight in the polar organic solvent to form a dispersion.

Specifically, the dispersion in (i) may be formed by the following steps (1)-(3):

(1) mixing the VDF polymer with an organic solvent to obtain a dispersion [Dispersion (A)];

(2) mixing the graphene oxide to the same organic solvent to obtain a dispersion [Dispersion (B)], optionally at an elevated temperature; and, (3) mixing Dispersion (A) and Dispersion (B) to form the dispersion in (i).

Optionally, said process further comprises the following step:

(ii) introducing an active electrode material in the dispersion by mechanical stirring.

In said step (ii), the mechanical stirring can be fulfilled with the aid of an mechanical stirrer (e.g. Dispermat® stirrer), to obtain a composite electrode material paste as the end product of step (ii).

Alternatively, the present invention also provides a different process for preparing the invented electrode-forming compositions, which comprises the following steps:

(A) Obtain a dispersion of graphene oxide and an electrode active material in an organic solvent;

(B) Prepare an organic solution of a VDF polymer in the same organic solvent used in step (A); and (C) Combine the dispersion of step (A) and the solution of step (B) by mechanical stirring, wherein the sequence of step (A) and step (B) is optionally reversed.

By casting the thus made composition on a metal current collector (e.g. an aluminium foil) and drying under a desired temperature and vacuum environment, a working electrode with graphene as conductive additive can be readily made.

The graphene used for the present invention can be produced by the reduction of delaminated graphite oxide by chemical methods, thermal methods, and ultraviolet-assisted methods.

According to one embodiment of the present invention, the oxygen content in the conductive graphene oxide additive in the electrode forming composition is not greater than 25% by weight, preferably from 0.5% to 21% by weight, more preferably from 1% to 16% by weight, more preferably from 1% to 8% by weight, and even more preferably from 1% to 5% by weight.

In a preferred embodiment of the present invention, the graphene oxide additive in the electrode forming composition is characterized by a large surface area property. Specifically, the specific surface area of the graphene oxide used in the present invention as measured by a 3-point BET method (Brunauer-Emmett-Teller isotherm adsorption technique with nitrogen) is preferably larger than 25 m$^2$/g, more preferably larger than 35 m$^2$/g, more preferably larger than 100 m$^2$/g, and even more preferably larger than 150 m$^2$/g.

Apart from graphene oxide, the electrode forming composition of the present invention can include additional conductive agent (s) such as carbon black, CNTs or the derivatives thereof (e.g. carbon nanobuds), fullerenes, carbon nanocones or nanodisks, and powders or fibers of metals.

According to a preferred embodiment of the present invention, the graphene oxide material is blended with a carbon black material to produce the conductive additive for an active electrode, which is found to exhibit very good conductivity and electrochemical behaviours in the testing electrodes.

The content of the graphene oxide conductive additive(s) may be 0.5 to 10% by weight with regard to the weight of the electrode according to the present invention. When the content of the graphene oxide conductive additive is below 0.5 wt %, the electrochemical characteristics of the electrode are likely degraded. When the content of the graphene conductive additive is above 10 wt %, the energy density per active mass in the electrode can be reduced.

An organic solvent is used in the electrode forming composition according to the present invention, to disperse the binder and the conductive additive(s) in the composition and homogenizing them with a later added electrode active material and all other suitable components to produce a paste to be applied to a metal collector.

Non-limitative examples of the polar organic solvent may include NMP, dimethylformamide, dimethylacetamide, N,N-dimethylaminopropylamine, tetrahydrofuran, and dimethyl sulfoxide. According to a preferred embodiment of the present invention, the NMP solvent is used.

As said, in a preferred embodiment of the present invention, the VDF polymer is a polymer comprising recurring units derived from vinylidene fluoride (VDF) and from at least one (meth)acrylic monomer (MA) having formula (I) here below:

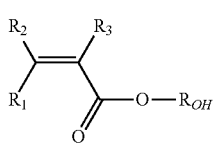

(I)

wherein:
  $R_1$, $R_2$ and $R_3$, equal to or different from each other, are independently selected from a hydrogen atom and a $C_1$-$C_3$ hydrocarbon group, and
  $R_{OH}$ is a hydrogen atom or a $C_1$-$C_5$ hydrocarbon moiety comprising at least one hydroxyl group.

The VDF polymer according to this embodiment comprises typically at least 50% by moles, preferably at least 70%, more preferably at least 80% by moles of recurring units derived from vinylidene fluoride (VDF).

The VDF polymer comprises typically at least 0.01% by moles, preferably at least 0.02% by moles, more preferably at least 0.03% by moles of recurring units derived from at least one (meth)acrylic monomer (MA) having formula (I) as described above.

The VDF polymer comprises typically at most 10% by moles, preferably at most 5% by moles, more preferably at most 2% by moles of recurring units derived from at least one (meth)acrylic monomer (MA) having formula (I) as described above.

The (meth)acrylic monomer (MA) of the VDF polymer preferably complies with formula (II) here below:

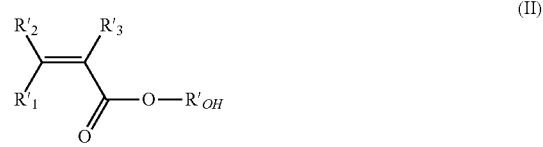

(II)

wherein:
  $R'_1$, $R'_2$ and $R'_3$ are hydrogen atoms, and
  $R'_{OH}$ is a hydrogen atom or a $C_1$-$C_5$ hydrocarbon moiety comprising at least one hydroxyl group.

Non-limitative examples of (meth)acrylic monomers (MA) include, notably, acrylic acid, methacrylic acid, hydroxyethyl(meth)acrylate, hydroxypropyl(meth)acrylate, hydroxyethylhexyl(meth)acrylate.

The (meth)acrylic monomer (MA) is more preferably selected from the followings:

hydroxyethyl acrylate (HEA) of formula:

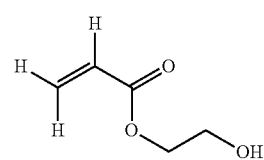

2-hydroxypropyl acrylate (HPA) of either of formulae:

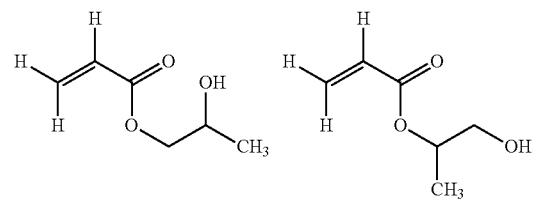

acrylic acid (AA) of formula:

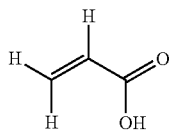

and mixtures thereof.

Good results have been obtained when the (meth)acrylic monomer (MA) of the VDF polymer is acrylic acid (AA) or hydroxyethyl acrylate (HEA).

Suitable VDF polymers for the present invention are commercially available from Solvay Specialty Polymers Italy S.p.A., such as those under the trade name of SOLEF®.

The VDF polymer may further comprise recurring units derived from at least one other fluorinated monomer different from VDF; said fluorinated monomer being preferably selected in the group consisting of vinylfluoride (VF1), chlorotrifluoroethylene (CTFE), hexafluoropropene (HFP), tetrafluoroethylene (TFE), perfluoromethylvinylether (MVE), trifluoroethylene (TrFE) and mixtures therefrom. Should the VDF polymer comprise recurring units derived from at least one other fluorinated monomer different from VDF, the polymer (VDF) typically comprises 0.1 to 20%, preferably from 0.1 to 15%, more preferably from 0.1 to 10% by moles of recurring units derived from said monomer(s).

The VDF polymer used in the invention is generally prepared by polymerizing means known in the art, using aqueous free-radical emulsion polymerization, although suspension, solution and supercritical $CO_2$ polymerization processes may notably also be used.

Typically, in said aqueous free-radical emulsion polymerization, a reactor is generally charged with deionized water, water-soluble surfactant capable of emulsifying the reactant mass during polymerization and optional paraffin wax antifoulant. The mixture is generally stirred and deoxygenated. A predetermined amount of chain transfer agent (CTA) can be advantageously introduced into the reactor, the reactor temperature is generally raised to the desired level and vinylidene fluoride (and possibly one or more additional monomers) is usually fed into the reactor. Typically, once the initial charge of vinylidene fluoride is introduced and the pressure in the reactor has reached the desired level, an initiator emulsion or solution is introduced to start the polymerization reaction. The temperature of the reaction can vary depending on the characteristics of the initiator used and one of skill in the art will know how to select the same. Typically the temperature will be from about 30° to 150° C., preferably from about 60° to 110° C. Generally, once the desired amount of polymer has been reached in the reactor, the monomer feed is stopped, but initiator feed is optionally continued to consume residual monomer. Residual gases (containing unreacted monomers) are typically vented and the latex recovered from the reactor.

The polymerization generally results in a latex of VDF polymer generally having a solids level of 10 to 60 percent by weight, preferably 10 to 50 percent, and having an average particle size of less than 500 nm, preferably less than 400 nm, and more preferably less than 300 nm. The average particle size is generally at least 20 nm and preferably at least 50 nm.

The latex of VDF polymer can be used as such for manufacturing the electrode-forming composition of the invention or the polymer can be coagulated, separated from the aqueous polymerization medium and provided under the form of particles for being incorporated in the electrode forming composition of the invention.

The composition of the invention generally comprises the VDF polymer in an amount of 0.5 to 10% wt, preferably from 1 to 8% wt, with respect to the total weight of the composition.

As said, the electrode forming composition of the present invention is adapted to blend with an active electrode compound, for producing an effective electrode in use. For the purpose of the present invention, by "active electrode compound" [compound (E)] it is intended to denote an electroactive particulate material which actively participates in the underlying redox reaction during charge/discharge phenomena of a secondary battery.

The nature of the compound (E) will depend on whether the aqueous composition of the invention will be used to form a positive (cathode) or a negative (anode) electrode. The active electrode compound can thus selected from active cathode compounds, herein below referred to as compounds (E+), and active anode compounds, herein below referred to as compounds (E−).

As the invention is particularly advantageous for providing composition suitable for the manufacture of positive electrodes, the compound (E) is generally an active cathode compound [compound (E+)].

The compound (E+) may be selected from the group consisting of:

composite metal chalcogenide represented by a general formula of $LiMY_2$, wherein M denotes one or more than one transition metal, including Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiMnO_2$ $LiNi_xCo_{1-x}O_2$ (0<x<1), $Li_xCo_{1-y}Al_yO_2$ (0<x<1, 0<y<1) and spinel-structured $LiMn_2O_4$; nevertheless a broader range of chalcogenides might be considered, including those represented by formulae:

$$Li_xMn_{1-y}M'_yA_2 \quad (1)$$

$$Li_xMn_{1-y}M'_yO_{2-z}Z_z \quad (2)$$

$$Li_xMn_2O_{4-z}A_z \quad (3)$$

$$Li_xMn_{2-y}M'_yA_4 \quad (4)$$

$$Li_xM_{1-y}M''_yA_2 \quad (5)$$

$$Li_xMO_{2-z}A_z \quad (6)$$

$$Li_xNi_{1-y}Co_yO_{2-z}A_z \quad (7)$$

$$Li_xNi_{1-y-z}Co_yM''_zA_a \quad (8)$$

$$Li_xNi_{1-y-z}Co_yM''_zO_{2-a}Z_a \quad (9)$$

$$Li_xNi_{1-y-z}Mn_yM'_zA_a \quad (10)$$

$$Li_xNi_{1-y-z}Mn_yM'_zO_{2-a}Z_a \quad (11)$$

wherein:
0.95≤x≤1.1, 0≤y≤0.5, 0≤z≤0.5, 0≤a≤2;
M is Ni or Co, M' is one or more elements selected from a group consisting of Al, Ni, Co, Cr, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, M" is one or more elements selected from a group consisting of Al, Cr, Mn, Fe, Mg, Sr, V, Sc, Y, La, Ce, Pr, Nd, Pm, Sm, Eu, Gd, Tb, Dy, Ho, Er, Tm, Yb, Lu, Ac, Th and Pa, A is selected from the group consisting of O, F, S and P, and Z is selected from the group consisting of F, S, and P;

a lithiated or partially lithiated transition metal oxyanion-based electrode materials of the nominal formula $AB(XO_4)_fE_{1-f}$, in which A is lithium, which may be partially substituted by another alkali metal representing less that 20% of the A metals, B is a main redox transition metal at the oxidation level of +2 chosen among Fe, Mn, Ni or mixtures thereof, which may be partially substituted by one or more additional metal at oxidation levels between +1 and +5 and representing less than 35% of the main +2 redox metals, including 0, $XO_4$ is any oxyanion in which X is either P, S, V, Si, Nb, Mo or a combination thereof, E is a fluoride, hydroxide or chloride anion, f is the molar fraction of $XO_4$ oxyanion, generally comprised between 0.75 and 1. The above $AB(XO_4)_fE_{1-f}$ electrode materials are preferably phosphate-based and may have an ordered or modified olivine structure. More preferably, the powdery electrode material as described above complies with formula $Li_{3-x}M'_yM''_{2-y}(XO_4)_3$ in which: $0 \leq x \leq 3$, $0 \leq y \leq 2$; M' and M'' are the same or different metals, at least one of which being a redox transition metal; $XO_4$ is mainly $PO_4$ which may be partially substituted with another oxyanion, in which X is either P, S, V, Si, Nb, Mo or a combination thereof. Still more preferably, the active material is a phosphate-based electrode material having the nominal formula $Li(Fe_xMn_{1-x})PO_4$ in which $0 \leq x \leq 1$, wherein x is preferably 1 (that is to say, Lithium Iron Phosphate of formula: $LiFePO_4$).

Preferred compounds (E+) are selected from the group consisting of: $LiCoO_2$, $LiNiO_2$, $LiMnO_2$ $LiNi_xCo_{1-x}O_2$ ($0<x<1$), $Li_xCo_{1-y}Al_yO_2$ ($0<x<1$, $0<y<1$), $LiMn_2O_4$ $LiFePO_4$ and $Li(Fe_xMn_{1-x})PO_4$ ($0<x<1$).

A compound (E+) which has been found particularly advantageous is $LiCoO_2$.

Nevertheless, the invention also encompasses composition suitable for forming a negative electrode for a lithium ion battery; according to these embodiments, the compound (E−) may preferably comprise:

graphitic carbons able to intercalate lithium, typically existing in forms such as powders, flakes, fibers or spheres (for example, mesocarbon microbeads) hosting lithium;

lithium metal;

lithium alloy compositions, including notably those described in U.S. Pat. No. 6,203,944 (3M INNOVATIVE PROPERTIES CO.) 20, Mar. 2001 and in WO 00/03444 (MINNESOTA MINING AND MANUFACTURING CO.) 10, Jun. 2005;

lithium titanates, generally represented by formula $Li_4Ti_5O_{12}$; these compounds are generally considered as "zero-strain" insertion materials, having low level of physical expansion upon taking up the mobile ions, i.e. $Li^+$;

lithium-silicon alloys, generally known as lithium silicides with high Li/Si ratios, in particular lithium silicides of formula $Li_{4.4}Si$;

lithium-germanium alloys, including crystalline phases of formula $Li_{4.4}Ge$;

silicon anodes;

silicon-carbon composite anodes.

An electrode made from the electrode-forming composition of the invention generally comprises the active electrode compound in an amount of from 80 to 98% wt, preferably from 85 to 97% wt, more preferably from 87 to 96% wt, with respect to the total weight of the electrode. As explained earlier, it is preferred to construct an electrode with a high content of the active electrode compound, preferably equal to or above 95%, to achieve an optimal energy density of the active mass.

The invention further pertains to a process for manufacturing any of the electrode-forming compositions described above.

The process advantageously comprises mixing the VDF polymer and the graphene oxide with an oxygen content of no more than 25 wt % in at least one polar organic solvent as detailed above, to form a stable suspension. Preferably, the stable suspension is formed by mixing using sonication means. The suspension can be obtained by mixing graphene oxide, the polymer, and the NMP solvent using a sonicator operated at 100-1000 W for a duration ranging between several minutes to a couple of hours, depending on the actual amount of each ingredient added in the mixture.

In the above process, the VDF polymer can be provided as dry powder or in the dissolved form in the polar organic solvent.

The process can further comprise a step of introducing at least one active electrode compound into the stable suspension, preferably by mechanical stirring. In one embodiment, the active electrode compound of $LiCoO_2$ is mixed into the stable suspension using a mechanical stirrer operated at a speed between 200-1500 rpm for a duration ranging between several minutes to a couple of hours, depending on the actual amount of ingredient added in the electrode forming composition.

Still another object of the present invention is a process for manufacturing an electrode structure using one of the electrode-forming compositions as above described.

Said process can comprise applying one of the above detailed electrode-forming compositions onto at least one surface of a substrate, preferably of a metal substrate.

The electrode-forming composition may be applied by any conventional wet coating process. Particularly, as non-limiting examples, the wet coating process may include screen printing, coating using a roll coater, a blade coater, a slit coater, a curtain coater, a wire coater, a sprayer, a foam applicator, a brush coater and the like.

The drying process for the coated bus electrode forming composition to form the photosensitive conductive layer may be selected depending upon the solvent used in the composition. As a non-limiting example, the drying may be performed at a temperature ranging from 50 to 150° C. As specific, non-limiting embodiments, the drying temperature may range from 50 to 100° C. or from 100 to 150° C.

Should the disclosure of any patents, patent applications, and publications which are incorporated herein by reference conflict with the description of the present application to the extent that it may render a term unclear, the present description shall take precedence.

EXAMPLES

The invention will be now described in more details with respect to the following examples, whose purpose is merely illustrative and not intended to limit the scope of the invention.

Preparative Example 1

Preparation of Solvent Dispersion for Carbon Conductive Additives

The dispersibility of several graphene oxide materials in an organic solvent of NMP (from Sigma-Aldrich) was tested against conventional carbon additive materials including carbon black (SUPER P® from Timcal), multi-wall carbon nanotubes (NC-7000® from Nanocyl), and graphene nanoplatelets (XGnP® from XG Science). The surface area and oxygen content of the as-received graphene oxide nanomaterials and graphene nanoplatelets were characterized, respectively, by BET method (Brunauer - Emmett - Teller isotherm adsorption technique with nitrogen) and elemental analysis based on emitted gas from sample combustion. In preparation for the BET analysis, all samples were first treated in a non-ventilated oven at 330° C. for 6 hours, and later subjected to vacuum drying at 150° C. for 2-4 hours to ensure that all samples entering the BET analysis were well dried and surfactant free. The BET equipment used in the analysis was a GEMINI 2360 from MICROMETRICS, and a 3-point BET method was applied in the analysis. The specific surface area parameter of each tested carbon nanomaterial was calculated using the STARDRIVER software and expressed in $m^2/g$. The thus-obtained data, together with the physical property data of the other carbon nanomaterials as provided by the manufacturer, were listed in Table 1 below.

TABLE 1

| Carbon nanomaterial | Product Code | Oxygen Content (wt %) | Surface Area ($m^2/g$) |
|---|---|---|---|
| Graphene Oxide | GNP-PDR05 | 1.5 | 500 |
| | GNP-PDR02 | 2.9 | 420 |
| | GNP-PDEX | 21.3 | 410 |
| | GNP-PD | 46.3 | 300 |
| Graphene nanoplatelets | XGNP ® | <1* | 28 |
| Carbon black | SUPER P ® | — | 62* |
| CNT | NC-7000 ® | — | 250-300* |

*Property data provided by the manufacturer

To prepare a solvent dispersion of each nanomaterial listed in Table 1, 20 ml of NMP was added to a glass vial containing 20 mg of a selected carbon nanomaterial, and the mixture was sonicated for 10 minutes using an output power of 10 Watt, to give a carbon/NMP suspension with a carbon concentration of 0.1%. Next, the resulting carbon/NMP suspensions were stored on the bench, for which the dispersion stability were visually observed for 10 days. The observation results for all organic dispersions are listed in Table 2 below.

TABLE 2

| Carbon nanomaterial | Carbon Dispersion No. | Whether a stable dispersion is maintained for 10 days (Yes/No) |
|---|---|---|
| GNP-PDR05 | 1 | Yes |
| GNP-PDR02 | 2 | Yes |
| GNP-PDEX | 3 | Yes |
| GNP-PD | 4 | No |
| XGNP ® | 5 | Yes |
| SUPER P ® | 6 | Yes |
| NC-7000 ® | 7 | Yes |

As seen from Table 2, the tested graphene material with the highest oxygen content (i.e. GNP-PD with an oxygen content of 46.3%) showed poor dispersion stability when mixed with NMP. In carbon suspension 4, which contains the GNP-PD, obvious sedimentation was observed within minutes upon forming the final suspension. By contrast, no obvious particle segregation was observed in carbon suspensions 1-3 and 5-7 for ten continuous days. Such observation confirms that graphene oxide materials having the oxygen content lower than 25% are compliant with a typical organic solvent like NMP, and thus are promising in making an electrode-forming composition.

Resistance Measurement of Film Composite Prepared from Different Carbon Nanomaterial A standardized lab-scale conductivity test was performed to measure the electrical resistance in the film composite made from different carbon nanomaterials according to Table 1. Firstly, various carbon/PVDF/NMP dispersions for each tested carbon nanomaterial were prepared following a two-step method. In step 1, a 10 wt % PVDF organic solution was prepared by adding 8 g of PVDF (SOLEF® 5130 PVDF power type product, an acrylic modified VDF polymer manufactured by Solvay Polymers Italy S.p.A.) to 72 g of NMP and subjecting the thus obtained mixture to an overnight mechanical stirring treatment at 60° C., using a magnetic stirrer in the reaction vial. The end product of step 1 is a viscous PVDF/NMP solution. Next, in step 2, 20 ml of NMP was added to a glass vial containing 20 mg of a carbon nanomaterial according to Table 1, and the mixture was sonicated for 10 minutes using an output power of 10 Watt, to give a carbon/NMP suspension with a carbon concentration of 0.1%. The thus made carbon/NMP suspension was then mixed with an appropriate amount of 10 wt % PVDF/NMP solution obtained from Step 1, using an ULTRA-TURRAX ® mixer (operational speed: 1000 rpm, duration: 15 s) to give a final suspension with a carbon content of 3, 5, 10, and 20 wt % (as shown in Table 3).

Next, from each of the homogenized carbon/PVDF/NMP suspensions obtained in Step 2, a droplet of 4 µl was withdrawn and subsequently deposited on a printed circuit board between two gold electrodes. After distilling off the solvent of each droplet at 80° C. under vacuum using an evaporator, the electrical resistance of the resulting droplet residue was measured by a numerical Keithley multimeter. The resistance measurement results are listed in Table 3 below.

TABLE 3

| Carbon nanomaterial | Resistivity (Ohm) of film composite made from dispersions with different carbon concentration | | | |
|---|---|---|---|---|
| | 3 wt % | 5 wt % | 10 wt % | 20 wt % |
| GNP-PDR05 | >$2.0 \times 10^{8}$* | $1.0 \times 10^{5}$ | $2.0 \times 10^{4}$ | $4.0 \times 10^{4}$ |
| GNP-PDR02 | >$2.0 \times 10^{8}$* | >$2.0 \times 10^{8}$* | >$2.0 \times 10^{8}$* | $1.0 \times 10^{4}$ |
| GNP-PDEX | >$2.0 \times 10^{8}$* | >$2.0 \times 10^{8}$* | >$2.0 \times 10^{8}$* | $2.0 \times 10^{7}$ |
| GNP-PD | >$2.0 \times 10^{8}$* | >$2.0 \times 10^{8}$* | >$2.0 \times 10^{8}$* | >$2.0 \times 10^{8}$* |
| XGNP ® | >$2.0 \times 10^{8}$* | >$2.0 \times 10^{8}$* | >$2.0 \times 10^{8}$* | >$2.0 \times 10^{8}$* |
| SUPER P ® | >$2.0 \times 10^{8}$* | >$2.0 \times 10^{8}$* | >$2.0 \times 10^{8}$* | $8.0 \times 10^{7}$ |
| NC-7000 ® | $1.0 \times 10^{5}$ | $8.0 \times 10^{4}$ | $8.0 \times 10^{3}$ | $1.0 \times 10^{3}$ |

*Resistance of these film composites is higher than $2.0 \times 10^{8}$ ohm (the measurement limit of the multimeter used), which is indicative of a very poor electrical conductivity close to an insulator.

As seen in Table 3, film composites made from graphene products with an oxygen content of less than 25% (corresponding to the measured oxygen content of GNP-PDR05, GNP-PDR02, or GNP-PDEX material) have a superior electrical conductivity than those made from carbon black (i.e. Super P®), at a same carbon concentration.

Preparation of Positive Electrode for Lithium Secondary Battery

Example 1

A graphene/NMP suspension containing 0.5 wt % of GNP-PDR05 was first prepared by adding 0.2 g of GNP-PDR05 to 40 g of NMP and subjecting the thus made mixture to a sonication treatment for 10 minutes (using an output power of 10 Watt). Next, 20 g of the resulting graphene/NMP suspension was mixed with 9.383 g of $LiCoO_2$ (purchased from Umicore) as a positive electrode active material and 6.267 g of a previously prepared 8 wt % SOLEF® 5130 PVDF/NMP suspension, and the resulting mixture was vigorously stirred for 1 hour using a DISPERMAT ® stirrer at a speed of 3000 rpm, to obtain a composite positive electrode material paste. The paste was coated onto an aluminium foil using a doctor blade casting technique and subsequently treated by 1 hour of heat drying at 130 ° C. under vacuum in an oven, to produce a positive electrode material having 94 wt % of $LiCoO_2$, 5 wt % of SOLEF® 5130 PVDF binder and 1 wt % of graphene conductive additive.

Examples 2-4

Electrodes containing $LiCoO_2$ as an active material, SOLEF® 5130 PVDF as binder material and GNP-PDR05 as the conductive additive are produced following the same procedure in Example 1. The exact amount of each component in Electrode Examples 2-4 was modified from that of Example 1, to give a fixed binder content of 5 wt % and different AM/CA concentrations as shown in Table 4.

Comparative Example 1

A comparative cathode example was prepared, using $LiCoO_2$ as an active material and SOLEF® 5130 PVDF as the binder material, without addition of any conductive additive. Specifically, 10.7 g of NMP was mixed with 9.383 g of $LiCoO_2$ and 7.27 g of a previously prepared 8 wt % SOLEF® 5130 PVDF/NMP suspension, and the resulting mixture was vigorously stirred for 1 hour using a DISPERMAT ® stirrer at a speed of 3000 rpm, to obtain a composite positive electrode material paste. The paste was coated onto an aluminium foil using a doctor blade casting technique and subsequently treated by 1 hour of heat drying at 130° C. under vacuum in an oven, to produce a positive electrode material having 95 wt % of $LiCoO_2$ and 5 wt % of SOLEF® 5130 PVDF binder, as shown in Table 4.

TABLE 4

| | Components (mg) added in the Cathode Paste | | | | Concentration of Primary Components in the Dry Cathode (wt %) | | |
|---|---|---|---|---|---|---|---|
| | $LiCoO_2$ | 0.5 wt % PDR05 in NMP | 8 wt % PVDF in NMP | Pure NMP | $LiCoO_2$ (AM) | PDR05 (CA) | PVDF (binder) |
| Ex. 1 | 9383 | 20000 | 6267 | — | 94 | 1 | 5 |
| Ex. 2 | 5802 | 30000 | 3917 | — | 93 | 2 | 5 |
| Ex. 3 | 3150 | 35000 | 2188 | — | 90 | 5 | 5 |
| Ex. 4 | 2199 | 35000 | 1569 | — | 88 | 7 | 5 |
| Comp. Ex. 1 | 11000 | — | 7270 | 10700 | 95 | 0 | 5 |

Comparative Example 2

A composite Cathode using $LiCoO_2$ as an active material, SOLEF® 5130 as the PVDF binder and carbon black as the conductive additive was produced as follows. A cathode paste was first made by adding 0.116 g of a pure carbon black (Super P® from Timcal), 10.884 g of $LiCoO_2$ material and 9 g of NMP solvent to 7.270 g of a previously prepared 8 wt % SOLEF® 5130/NMP suspension, and mechanically stirring the resulting mixture for 3 hours, using a Dispermat® stirrer operated at 3000 rpm. The thus made paste was coated onto an aluminium foil using a doctor blade casting technique and subsequently treated by 1 hour of heat drying at 130° C. under vacuum in an oven, to produce a cathode material having 94 wt % of $LiCoO_2$, 5 wt % of PVDF binder and 1 wt % of carbon black conductive additive.

Comparative Examples 3-6

Electrodes containing LiCoO2 as an active material, SOLEF® 5130 as the PVDF binder and carbon black SUPER® P as the conductive additive were produced following the same procedure in Comparative Example 2. The exact amount of each component in preparing the cathode paste in Comparative Examples 3-5 was modified from Comparative Example 2, to give a fixed binder content of 5 wt % and different AM/CA concentrations as shown in Table 5.

TABLE 5

| | Components (mg) added in the Cathode Paste | | | | Primary Components in the Dry Cathode (wt %) | | |
|---|---|---|---|---|---|---|---|
| | $LiCoO_2$ | SUPER P ® | 8 wt % PVDF/NMP | Pure NMP | $LiCoO_2$ (AM) | SUPER P ® (CA) | PVDF (binder) |
| Comp. Ex. 1 | 11000 | — | 7270 | 10700 | 95 | 0 | 5 |
| Comp. Ex. 2 | 10884 | 116 | 7270 | 9000 | 94 | 1 | 5 |
| Comp. Ex. 3 | 10768 | 232 | 7270 | 8000 | 93 | 2 | 5 |
| Comp. Ex. 4 | 10653 | 347 | 7270 | 8000 | 92 | 3 | 5 |
| Comp. Ex. 5 | 10421 | 579 | 7270 | 9000 | 90 | 5 | 5 |
| Comp. Ex. 6 | 10189 | 811 | 7270 | 10000 | 88 | 7 | 5 |

Comparative Example 7

This comparative electrode example was made essentially following the procedure of Example 1, except that the 6.267 g of 8 wt % SOLEF® 5130 PVDF/NMP suspension was replaced by 2.66 g of 20 wt % SOLEF® 6010 PVDF dispersed in NMP, where the SOLEF® 6010 PVDF is a PVDF homopolymer manufactured by Solvay Specialty Polymers Italy S.p.A. The cathode material produced from this comparative example is an electrode having 94 wt % of $LiCoO_2$, 5 wt % of PVDF SOLEF® 6010 and 1 wt % of graphene.

Example 5

An electrode sample containing $LiCoO_2$ as an active material, SOLEF® 5130 as the PVDF binder and a combination of GNP-PDR05 and carbon black SUPER® P as the conductive additive was produced following a similar procedure in Example 1, except for the following modification:

12 g of $LiCoO_2$ was mixed with 20 g of a graphene/carbon black/NMP suspension, which was prepared by mixing 40 mg of Super® P and 80 mg of PDR05 in 20 g NMP solvent; and, 7.8 g of a previously prepared 8 wt % SOLEF® 5130 PVDF/NMP suspension was added to the $LiCoO_2$/ graphene/carbon black/NMP mixture, to produce a cathode material having 94 wt % of $LiCoO_2$, 5 wt % of PVDF SOLEF® 5130 and 1 wt% of mixed graphene and carbon black (2:1 in weight ratio).

Comparative Example 8

This comparative electrode example of was made essentially following the procedure of Example 5, except that the 7.8 g of 8 wt % SOLEF® 5130 PVDF/NMP suspension was replaced by 3.18 g of 20% SOLEF® 6010 PVDF/NMP suspension. The cathode material produced from this comparative example is an electrode having 94 wt % of $LiCoO_2$, 5 wt % of PVDF SOLEF® 6010 and 1 wt % of mixed graphene and carbon black (2:1 in weight ratio).

Evaluation of Properties of Positive Electrode for Lithium Secondary Battery

Conductivity Measurement

Each of the positive electrodes made in Examples 1-5 and Comparative Examples 1-8 was punched to have a diameter of 10 mm and then assembled between two current collectors. On the top of such a cathode assembly was placed a metal cylinder weighing 2.5 kg, giving a measurement pressure of 5 kg·F·cm$^{-2}$. Next, a voltage of 0.1, 0.2, and 0.3 Volt was sequentially applied to the compressed cathode assembly, for 10 seconds, and the current passing through the assembly under each voltage was measured using a multimeter. For each cathode assembly, four repeated current measurements were conducted under one testing voltage (0.1, 0.2, or 0.3 Volt), to give an averaged current value under said voltage, which was then used to deduce one internal resistance value by the classic Ohm's Law equation. The final internal resistance of each electrode assembly was determined by an average of the three internal resistance values calculated under three testing voltages, and this resistance average was then normalized with respect to a thickness of the particular film composite cathode to indicate its conductivity.

FIG. 1 is a graph comparing the percolation curves obtained from Examples 1-4 and Comparative Examples 1-6, wherein each percolation curve is obtained by plotting the electrode conductivity in logarithm scale ('σ', expressed in the unit of S/cm) against the conductive additive content (expressed as the weight percentage with respect to the total electrode mass) in the tested cathode assemblies. In FIG. 1, diamonds and open circles are used respectively to represent data obtained from cathodes containing different percentage of carbon black (Super P®) and graphene oxide (PDR05).

As shown in FIG. 1, by replacing carbon black with graphene in the positive electrodes having SOLEF® 5130 binder, the percolation threshold shifts from 5 wt % conductive additive content (SUPER P®) to 1 wt % conductive additive content (PDR05). In other words, at one fifth the carbon content in the tested positive electrode, graphene additive provided an equally satisfactory conductivity as the conventional carbon black additive.

Moreover, electrode Example 5, which contains 1 wt % of mixed graphene and carbon black (2:1 in weight ratio) as conductive additive, has shown significantly higher conductivity ($3.2 \times 10^{-4}$ S/cm) than electrode Example 1 ($1.5 \times 10^{-5}$ S/cm), which contains 1 wt % graphene as the sole component of conductive additive.

Another observed phenomenon is that, by selecting an acrylic modified PVDF binder (i.e. SOLEF® 5130) over a PVDF homopolymer binder (i.e. SOLEF® 6010), the electrode conductivity is further enhanced. See Table 6 below.

TABLE 6

| | PVDF binder (5 wt %) | CA (1 wt %) | Conductivity (S/cm) |
|---|---|---|---|
| Ex. 1 | SOLEF ® 5130 | PDR05 | $1.5 \times 10^{-5}$ |
| Comp. Ex. 7 | SOLEF ® 6010 | PDR05 | $3.2 \times 10^{-6}$ |
| Ex. 5 | SOLEF ® 5130 | PDR05/SUPER P ® | $3.2 \times 10^{-4}$ |
| Comp. Ex. 8 | SOLEF ® 6010 | PDR05/SUPER P ® | $5.8 \times 10^{-5}$ |

Electrochemical Analysis

3-Electrode Cell Test

The electrochemical properties of the positive electrodes were subsequently assessed in a 3-electrode cell. The 3-electrode cell consisted of a reference electrode and a counter electrode both made of a lithium foil, as well as a working electrode made of a composite film prepared by casting the previously made cathode paste onto an aluminium foil. The 3-electrode cell further included a separator of Whatman paper previously wetted with an electrolyte containing 1M LiPF$_6$ in Ethylene Carbonate/Dimethyl Carbonate (50/50), to prevent short circuit while allowing lithium ion transportation between the working electrode and counter electrode. With the 3-electrode cell configuration for cathode Example 1, Comparative Example 2, or Comparative Example 5, cyclic voltammetry experiments were performed from 3.3 to 4.3 V vs. the standard Li$^+$/Li electrode, for four cycles. The scan rate was rather low, at 25 µV/s.

Figure 2:
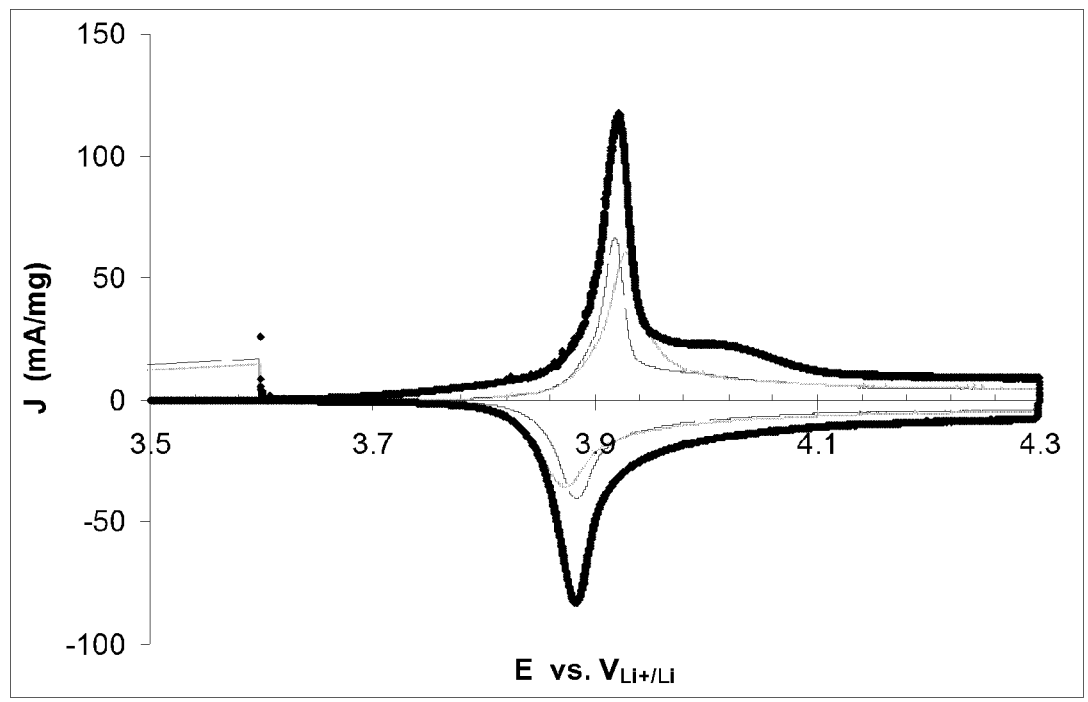
FIG. 2 is a graph comparing the cyclic voltammetry curves obtained from cathodes with different percentages of carbon black (SUPER P®) and graphene oxide (PDR05).

FIG. 2 is a graph comparing the electrochemical properties of cathode Example 1, Comparative Example 2 and Comparative Example 5, where the measured current density (expressed as current per active mass, J) was plotted against the applied potential vs. standard Li$^+$/Li electrode (potential vs. $V_{Li^+/Li}$ that corresponds to 3 V vs. RHE (Reference Hydrogen Electrode)). The solid diamond represents the cyclic voltammetry curve obtained from the cathode containing 1 wt % PDR05 graphene as conductive additive. The solid line and dashed line in FIG. 2 represent the cyclic voltammetry curves obtained from the cathode containing 5 wt % and 1 wt % SUPER P® additive, respectively.

As seen from FIG. 2, substitution of carbon black additive by graphene additive in the tested cathode Examples did not alter the general shape of the measured cyclic voltammetry curve, judging by the unchanged positions of the cathodic and anodic peak potentials (i.e. 3.92 V and 3.88 V vs. $V_{Li+/Li}$). However, the peak current observed for the electrodes using 5 wt % or 1 wt % SUPER P® conductive additive are several orders lower than that observed for the electrode containing 1 wt % PDR05 graphene. This confirmed the fast kinetics provided by the electrode made with graphene conductive additive.

Coin Cell Test

Two lithium half coin cells were assembled, respectively, using electrode Example 5 and comparative Example 8 as described above. The discharge capacities of the two coin cells were tested over different discharging rate, with the results indicated below.

TABLE 7

| Electrode | PVDF binder type | Discharge rate (h$^{-1}$) | Discharge capacity (mAh/g) |
|---|---|---|---|
| Ex. 5 | SOLEF ® 5130 | 1 | 88 |
| | | 2 | 37 |
| | | 5 | 2.6 |
| Comp. Ex. 8 | SOLEF ® 6010 | 1 | 92 |
| | | 2 | 21 |
| | | 5 | ~0 |

Judging from the data in Table 7, discharge capacities of the two electrodes with different PVDF binder at the lower discharge rate were essentially the same. However, at higher discharge rates, the electrode using the binder of an acrylic modified PVDF (i.e. SOLEF® 5130) showed a superior discharge capacity comparing to the electrode using a PVDF homopolymer binder (i.e. SOLEF® 6010).

The invention claimed is:

1. An electrode-forming composition comprising:
   from 0.5 to 10 wt. %, based on the total weight of the composition, of at least one vinylidene fluoride (VDF) polymer;
   at least one polar organic solvent;
   from 80 to 98 wt. %, based on the total weight of the composition, of at least one active electrode material; and
   from 0.5 to 10 wt. %, based on the total weight of the composition, of a graphene oxide having an oxygen content of from 1 to 5% by weight; wherein: the VDF polymer comprises recurring units derived from vinylidene fluoride (VDF) and from at least one (meth) acrylic monomer (MA) of formula (I):

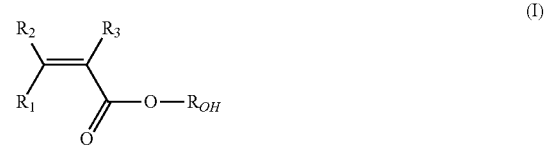

wherein:
   $R_1$, $R_2$ and $R_3$, equal to or different from each other, are independently selected from a hydrogen atom and a $C_1$-$C_3$ hydrocarbon group, and
   $R_{OH}$ is a hydrogen atom or a $C_1$-$C_5$ hydrocarbon moiety comprising at least one hydroxyl group.

2. The composition according to claim 1, wherein the active electrode material is selected from the group consisting of active cathode compounds.

3. The composition according to claim 2, wherein the active electrode material is selected from the group consisting of LiCoO$_2$, LiNiO$_2$, LiMnO$_2$ LiNi$_x$Co$_{1-x}$O$_2$, Li$_x$Co$_{1-y}$Al$_y$O$_2$, LiMn$_2$O$_4$, LiFePO$_4$ and Li(Fe$_x$Mn$_{1-x}$)PO$_4$—, wherein 0<x<1 and 0<y<1.

4. The composition of claim 1, said composition additionally comprising at least one electroconductivity-imparting additive selected from the group consisting of carbon black, carbon nanotubes or derivatives thereof, fullerenes, carbon nanocones or nanodisks, and powders and fibers of metals.

5. The composition of claim 1, said composition additionally comprising carbon black.

6. The composition of claim 1, wherein the polar organic solvent is selected from the group consisting of N-methyl-2-pyrrolidone (NMP), dimethylformamide, dimethylacetamide, N, N-dimethylaminopropylamine, tetrahydrofuran, and dimethyl sulfoxide.

7. The composition of claim 6, wherein the polar organic solvent is NMP.

8. A process for preparing an electrode-forming composition according to claim 1, said process comprising:
   (i) mixing the VDF polymer, the active electrode material, and the graphene oxide having an oxygen content of from 1 to 5% by weight in the polar organic solvent to form a dispersion; and
   (ii) introducing an active electrode material in the dispersion by mechanical stirring.

9. The process of claim 8, wherein the dispersion in (i) is formed by the following steps:
   (1) mixing the VDF polymer with an organic solvent to obtain a dispersion [Dispersion (A)];

(2) mixing the graphene oxide with the same organic solvent used in step (1) to obtain a dispersion [Dispersion (B)]; and, (3) mixing Dispersion (A) and Dispersion (B) to form the dispersion in (i).

10. A process for preparing an electrode-forming composition according to claim 1, comprising the following steps:

(A) obtaining a dispersion of the graphene oxide and the electrode active material in the organic solvent;

(B) preparing an organic solution of the VDF polymer in the same organic solvent used in step (A); and (C) combining the dispersion of step (A) and the organic solution of step (B) by mechanical stirring, wherein the sequence of step (A) and step (B) is optionally reversed.

11. A process for manufacturing an electrode structure, said process comprising applying the electrode-forming composition according to claim 1 onto at least one surface of a substrate.

12. The process of claim 11, wherein the electrode-forming composition is applied by a wet coating process.

13. The process of claim 12, wherein the wet coating process is selected from the group consisting of screen printing, coating using a roll coater, coating using a blade coater, coating using a slit coater, coating using a curtain coater, coating using a wire coater, coating using a sprayer, coating using a foam applicator, and coating using a brush coater.

* * * * *